J. REGAR.
FAUCET ATTACHMENT.
APPLICATION FILED DEC. 6, 1915.
1,214,220.   Patented Jan. 30, 1917.
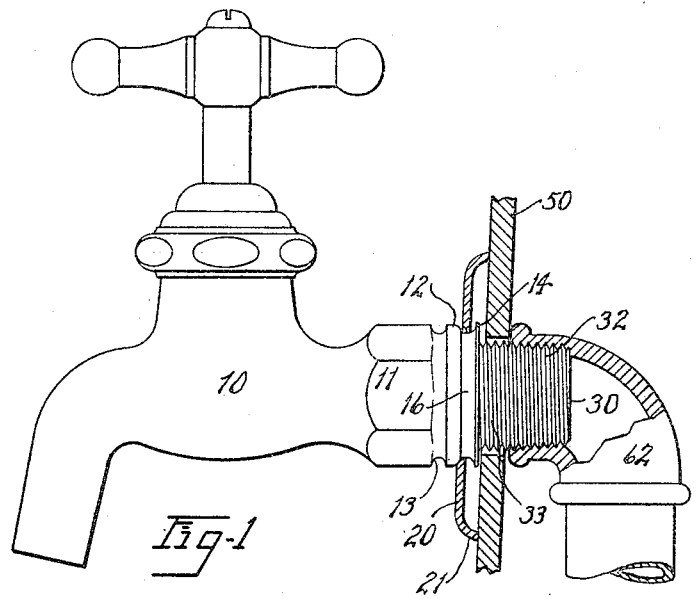
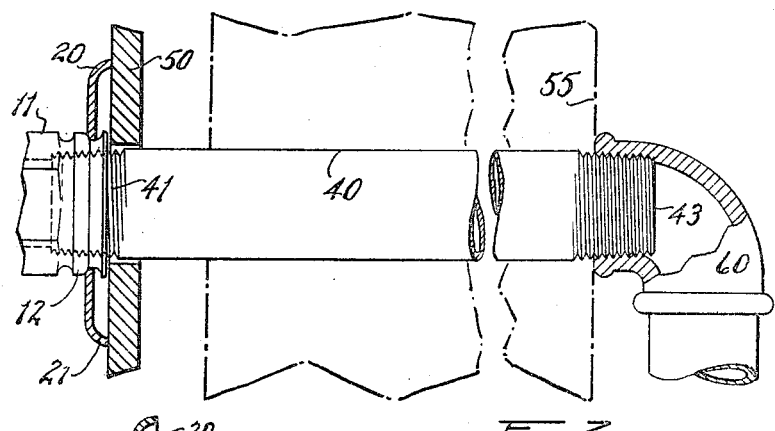
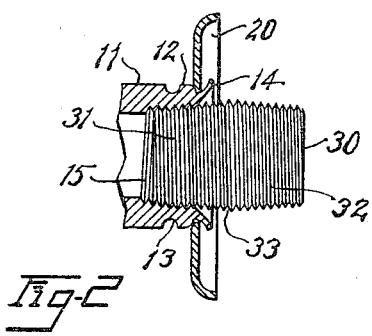
Inventor
Joseph Regar,
By Albert W. Baker
Atty.

UNITED STATES PATENT OFFICE.

JOSEPH REGAR, OF CLEVELAND, OHIO, ASSIGNOR TO THE REGAR BRASS MANUFACTURING COMPANY, OF CLEVELAND, OHIO, A CORPORATION OF OHIO.

FAUCET ATTACHMENT.

1,214,220.  Specification of Letters Patent.  Patented Jan. 30, 1917.

Application filed December 6, 1915. Serial No. 65,188.

*To all whom it may concern:*

Be it known that I, JOSEPH REGAR, a citizen of the United States, residing at Cleveland, in the county of Cuyahoga and State of Ohio, have invented a certain new and useful Improvement in Faucet Attachments of which the following is a full, clear, and exact description, reference being had to the accompanying drawings.

The object of this invention is to provide a very simple, cheap and neat escutcheon attachment for the shanks of bibs, cocks or other faucets, which will enable the faucet to make a tight connection with a lavatory back though the latter be inclined or out of true; will prevent the escutcheon from cracking the enamel under similar circumstances, and will enable a tight and sanitary fitting to be effected with little labor. In accomplishing the above results I provide on the shank of the faucet a loose escutcheon plate or collar which bears against an annular shoulder on the shank in front thereof and may tip into various positions, as required to make a tight connection. To prevent the collar becoming displaced before the faucet is attached I flange the shank of the faucet outwardly behind the collar. The collar thus becomes attached to the faucet but is capable of movement with reference thereto.

I find it very economical to form the annular shoulder which takes the thrust of the escutcheon quite near the rear end of the shank and to bend the extreme end outwardly by spinning or other action, behind the escutcheon, the fastening of the water pipe being provided by female threads within the rear portion of the shank. These threads accordingly extend within the portion of the shank which has the annular rib, and, if desired, within the portion in front thereof which may have an angular exterior for the application of a wrench. The female fitting described may be readily converted into a male fitting by placing within the female threads an externally threaded and projecting nipple.

My invention comprises the various features above referred to, as hereinafter more fully described and as summarized in the claims.

The drawings show an approved embodiment of my invention, Figure 1 being a sectional side elevation thereof, showing the faucet attached to the usual metal lavatory back with the elbow of the water pipe directly behind the same; Fig. 2 is a vertical section through the rear portion of the shank showing the threaded nipple for converting the female fitting into a male, as employed in Fig. 1; Fig. 3 is a view in sectional elevation showing the female fitting applied to a lavatory back or other slab where the water pipe is distant from such back, as for example, on the opposite side of a wall, the wall being indicated diagrammatically by broken lines.

As shown in Fig. 1, 10 designates the body of the faucet, 11 the hexagonal exterior on the shank thereof, 12 an annular rib at the rear of the hexagon (which may be separated by an annular groove 13), and 14 the outwardly flanged rear edge of the shank. The interior of this shank is provided with female threads 15 (Fig. 2), which are preferably tapered to correspond with the taper of a standard iron pipe fitting.

20 in each of the views indicates the collar or escutcheon which is a comparatively thin plate or disk rounded rearwardly at its edge, as shown at 21. This disk has a central opening which is somewhat larger in diameter than the diameter of the annular groove 16 between the rib 12 and the flange 14, but is smaller than either such rib or flange. Accordingly the escutcheon stands loosely in place in the groove 16 but is retained therein against material longitudinal movement in either direction. The escutcheon, however, can tip in any direction as required to compensate for an inclined or irregular lavatory back. The rear extension 21 of the escutcheon is sufficient to more than overhang the flange 14 so that the thrust when the faucet is turned into place will be taken by the lavatory back to the escutcheon and from it to the annular rib 12.

One of the objects of the flange 14 is to prevent the escutcheon becoming separated from the shank before the faucet is put in place or when it is removed. This flange performs a further function, however, in that it effectively overhangs the boundary of the hole in the lavatory back, which is loosely occupied by the nipple 30 or pipe 40, and as the rear end of the flange is only a comparatively short distance in front of the lavatory back when the escutcheon is in place, this flange forms a positive limit, preventing the faucet being screwed rearwardly sufficiently to distort the escutcheon.

It is desirable to be able to market the faucet with the escutcheon described retained loosely on the shank, either as a female or male fitting. 30 in Figs. 1 and 2 indicates a short threaded nipple which may be turned into the threads 15 and thus convert the structure into a male fitting. This nipple is preferably tapered from each end, having similar tapered threads on each longitudinal half so that it may be screwed either end foremost into the threads 15. The nipple is somewhat more than twice as long as the standard threaded engagement of a water pipe with a faucet shank. The female threads 15 preferably correspond with such standard, and they are occupied by a corresponding portion 31 of the nipple. A similar portion 32 at the other end of the nipple provides means for attaching to the standard elbow or other fitting, while the intermediate portion 33 of the nipple is the part designed to extend freely through an opening in the lavatory back. It is convenient, however, to thread the nipple throughout, as shown in Fig. 2.

In Figs. 1 and 3, 50 indicates the lavatory back. When it is convenient for the elbow 60 of the water pipe to abut the rear of this back, the short male nipple may well be used, effecting the fitting as shown in Fig. 1. In Fig. 3 the construction of the faucet and collar is the same as already described, but the short nipple 30 is avoided, and an iron pipe, indicated at 40, and having suitable threads 41 at its forward end, engages the internal threads of the shank. In this figure the elbow is shown as abutting the opposite side of a wall indicated at 55, the rear end of the pipe 40 being threaded as at 43 to engage the elbow.

The engagement of the nipple 30 and pipe 40 with the shank of the faucet being of a tapered character, it is possible to easily make a water tight connection between these parts, though such connection does not allow much adjustment. However, some adjustment is possible, and, furthermore, the spring of the escutcheon 20 allows a slight variation in the distance required between the rear end of the shank and the front of the lavatory back. Accordingly, with this fitting it is easy to put the parts together so that sufficient adjustment is allowed that the faucet may always be in its upright position and the necessary tight connection maintained not only between the shank and water pipe or nipple but between the shank and collar and the collar and lavatory back. The shank and pipe are first coupled with approximate tightness with the faucet standing 90° or so from the vertical, whereupon a quarter turn will bring it into the upright position and will at the same time tighten the joints and clamp the escutcheon.

Having thus described my invention what I claim is:

1. In a device of the character described, the combination of a faucet shank having an external annular shoulder formed thereon a short distance in front of its rear end, said shank being internally threaded from the rear end, and an escutcheon plate loosely surrounding the shank at the rear of the shoulder and adapted to bear against said shoulder.

2. In a faucet attachment, the combination of a faucet shank having an annular shoulder, and an escutcheon plate loosely surrounding the shank at the rear of the shoulder and extending at its outer edge rearwardly behind the plane of the rear end of the shank, and the shank being internally threaded from the rear end.

3. In a faucet attachment, the combination of a one piece faucet shank having an annular shoulder, and an escutcheon plate loosely surrounding the shank at the rear of the shoulder, the material of the shank being flanged outwardly at the rear of the escutcheon.

4. In a faucet attachment, the combination of a shank having a rigid annular shoulder, an escutcheon plate loosely surrounding the shank at the rear of the shoulder, the shank being flanged outwardly at the rear of the escutcheon and the escutcheon extending at its outer edge rearwardly behind the plane of the rear end of the shank, the flange being adapted to abut a lavatory back and thereby prevent distortion of the escutcheon.

5. The combination of a faucet having an annular rib formed on its shank and an annular seat at the rear of such rib, an internal thread extending forwardly from the rear end of the shank, and a collar loosely occupying such seat and adapted to bear against said rib, the extreme rear end of the shank being flanged outwardly at the rear of the collar to retain it loosely in place, and the outer edge of the collar extending rearwardly behind the rear end of the shank.

6. The combination of a faucet having an angular portion formed on the exterior of its shank, an annular rib at the rear of such angular portion, an annular seat at the rear of the rib, and an internal thread extending forwardly from the rear end of the shank, and a collar loosely occupying such seat and adapted to bear against said rib, the extreme edge of the collar extending rearwardly behind the plane of the rear end of the shank.

7. The combination of a faucet having an angular portion on the exterior of its shank, an annular rib at the rear of such angular portion, an annular groove at the rear of the rib, and an internal thread extending forwardly from its rear end, and a collar loosely occupying such groove and adapted to bear against said rib, the extreme rear end of the shank being flanged outwardly at the rear of the collar to retain it loosely in place.

8. The combination of a faucet having on its shank an annular rib and an annular seat at the rear of the rib, and internal threads extending forwardly from its rear end, a collar loosely occupying such seat and adapted to bear against said rib, the extreme rear end of the shank being flanged outwardly at the rear of the collar to retain it loosely in place, and a nipple threaded from each end and adapted to occupy the internal thread on the shank to provide a male fitting.

In testimony whereof, I hereunto affix my signature.

JOSEPH REGAR.

Copies of this patent may be obtained for five cents each, by addressing the "Commissioner of Patents, Washington, D. C."